United States Patent
Razakarivony et al.

(10) Patent No.: US 12,552,551 B2
(45) Date of Patent: Feb. 17, 2026

(54) METHOD FOR DETERMINING AN EFFICIENCY FAULT OF AN AIRCRAFT TURBOSHAFT ENGINE MODULE

(71) Applicants: SAFRAN, Paris (FR); SAFRAN HELICOPTER ENGINES, Bordes (FR)

(72) Inventors: Sébastien Philippe Razakarivony, Moissy-Cramayel (FR); Christophe Favre, Moissy-Cramayel (FR); Julien Joseph, Moissy-Cramayel (FR); Jean Lamouroux, Moissy-Cramayel (FR)

(73) Assignees: SAFRAN, Paris (FR); SAFRAN HELICOPTER ENGINES, Bordes (FR)

( * ) Notice: Subject to any disclaimer, the term of this patent is extended or adjusted under 35 U.S.C. 154(b) by 249 days.

(21) Appl. No.: 18/251,340

(22) PCT Filed: Oct. 28, 2021

(86) PCT No.: PCT/EP2021/079926
§ 371 (c)(1),
(2) Date: May 1, 2023

(87) PCT Pub. No.: WO2022/096354
PCT Pub. Date: May 12, 2022

(65) Prior Publication Data
US 2023/0415921 A1   Dec. 28, 2023

(30) Foreign Application Priority Data
Nov. 3, 2020 (FR) .................................... 2011242

(51) Int. Cl.
*B64F 5/60* (2017.01)
*F02C 7/00* (2006.01)
*G05B 23/02* (2006.01)

(52) U.S. Cl.
CPC .................. *B64F 5/60* (2017.01); *F02C 7/00* (2013.01); *G05B 23/0254* (2013.01); *F05D 2260/80* (2013.01)

(58) Field of Classification Search
CPC ..... B64F 5/60; F02C 7/00; F02C 9/00; G05B 23/0254; G05B 2219/45071; F05D 2260/80; F05D 2270/71
See application file for complete search history.

(56) References Cited

U.S. PATENT DOCUMENTS 6,684,851 B1 * 2/2004 Galtier .................. F02P 5/1514
701/115
7,177,758 B2 * 2/2007 Kruse .................... G01M 15/05
73/114.61

(Continued)

FOREIGN PATENT DOCUMENTS

| DE | 10020448 A1 * | 10/2001 | ......... F02D 41/1406 |
| EP | 2699778 A1 | 2/2014 | |
| EP | 2905666 A1 | 8/2015 | |

OTHER PUBLICATIONS

International Search Report from corresponding International Application No. PCT/EP2021/079926, dated Feb. 9, 2022, 2 pages.

*Primary Examiner* — Aniss Chad
*Assistant Examiner* — Nikki Marie M Molina
(74) *Attorney, Agent, or Firm* — RANKIN, HILL & CLARK LLP

(57) ABSTRACT

A method for determining an efficiency fault of at least one module of a turboshaft engine of an aircraft. The method comprising a step of determining an estimated real mapping, a step of determining real indicators from the estimated real mapping, a step of determining a plurality of simulated mappings from a simulation of a theoretical model of the turboshaft engine for different efficiency configurations, a step of determining simulated indicators for each simulated (Continued)

mapping, a step of training a mathematical model by coupling the simulated indicators with efficiency configurations, and a step of applying said mathematical model to the real indicators so as to deduce therefrom a real efficiency configuration.

20 Claims, 4 Drawing Sheets

(56) References Cited

U.S. PATENT DOCUMENTS

| | | | |
|---|---|---|---|
| 2004/0024516 A1 | 2/2004 | Hook et al. | |
| 2017/0286572 A1* | 10/2017 | Hershey | B64F 5/60 |
| 2018/0283200 A1* | 10/2018 | Gill | G01M 15/14 |
| 2019/0147412 A1* | 5/2019 | Chiaramonte | G06Q 10/20 |
| | | | 705/7.13 |

* cited by examiner

[Fig. 1]
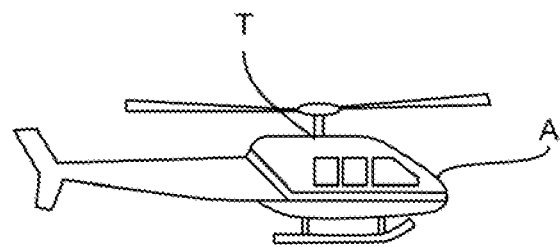
[Fig. 2]
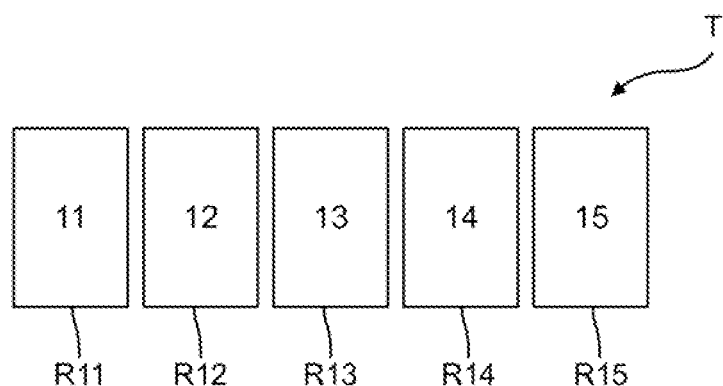

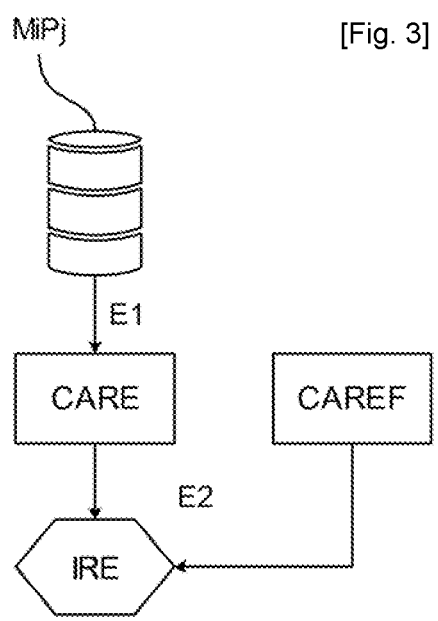
[Fig. 3]
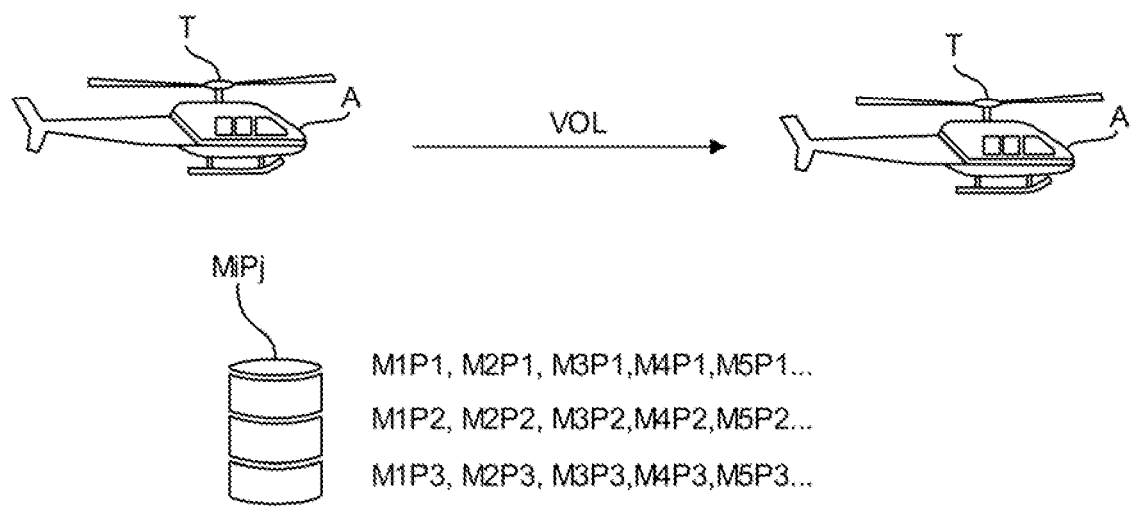
[Fig. 4]

[Fig. 5]
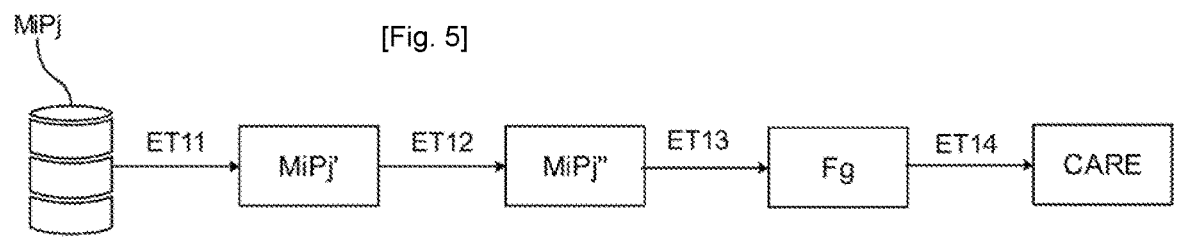
[Fig. 6]
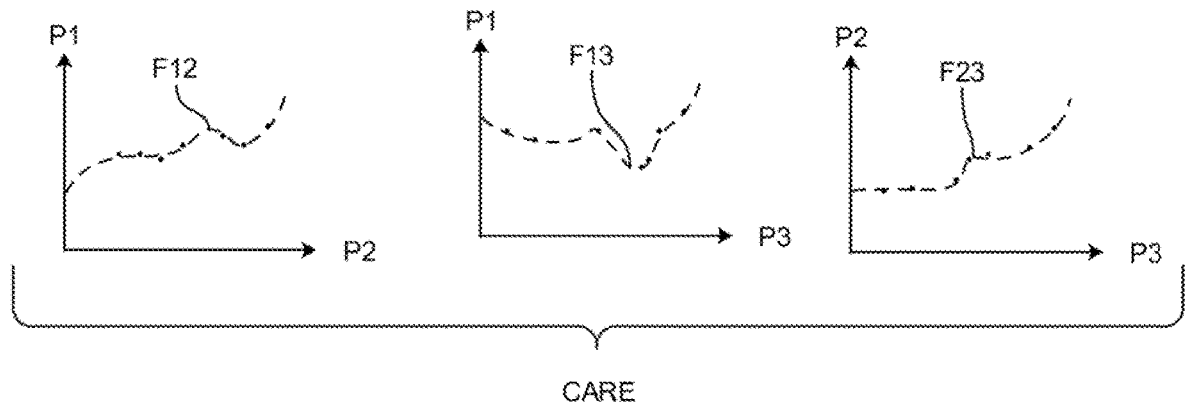
[Fig. 7]
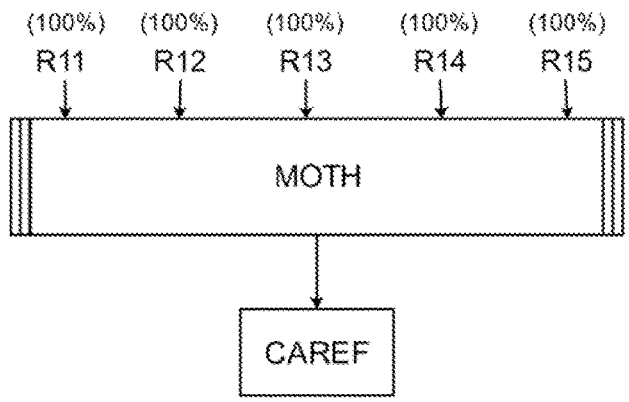

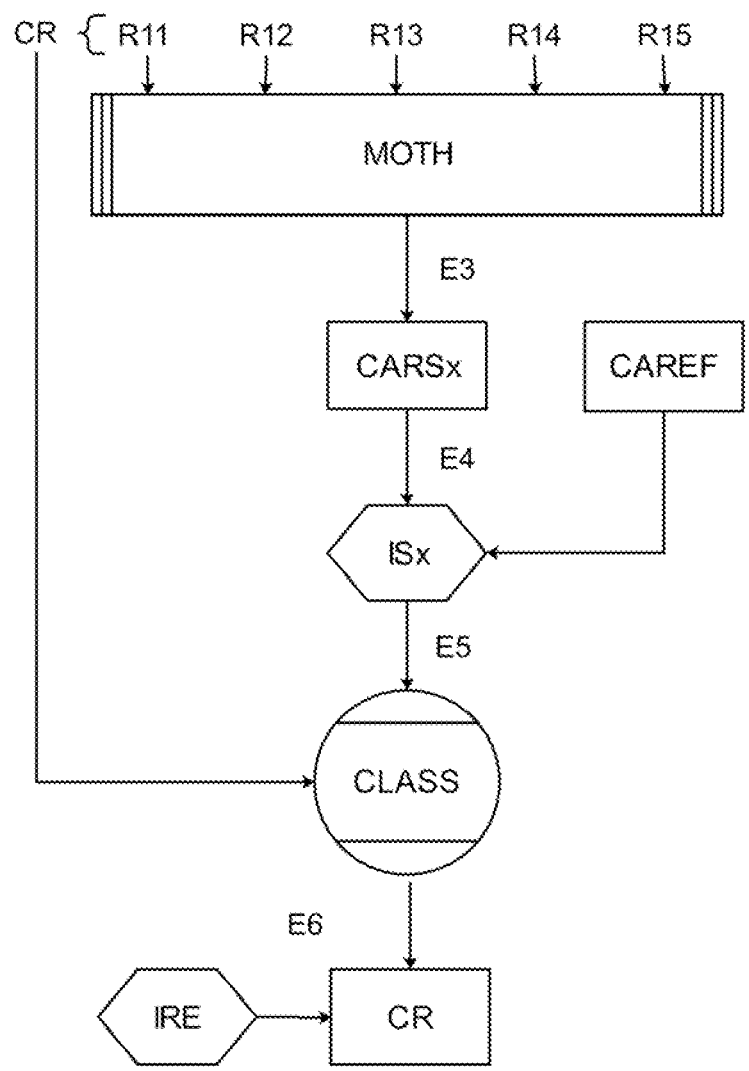
[Fig. 8]

METHOD FOR DETERMINING AN EFFICIENCY FAULT OF AN AIRCRAFT TURBOSHAFT ENGINE MODULE

TECHNICAL FIELD

The present invention relates to the field of fault determination of an aircraft turboshaft engine.

In the prior art, it is known to record the flight data of a turboshaft engine (temperature, pressure, rotation speed, etc.) and compare them with a database in order to determine potential faults. In a known manner, the database comprises flight data associated with faults. This database is constructed from detections of faults passed during actual flights or from theoretical data obtained by simulations of theoretical faults.

Determining a turboshaft engine fault depends not only on the quality of the flight data but also on the relevance of the database. In practice, such a comparison is complex and different diagnoses, which are not very accurate, may correspond to similar data. In particular, for a turboshaft engine comprising several modules (low-pressure compressor module, high-pressure compressor module, combustion chamber, high-pressure turbine module and low-pressure turbine module), the defective module and the cause of the fault cannot be precisely determined using the method.

One solution to gain accuracy would be to integrate sensors in all the modules of the turboshaft engine so that each module can be independently characterized. Such a solution may be considered for bench tests but is not possible on an industrial level. First of all, the installation of such sensors is time-consuming and complex. Above all, such sensors are placed in critical environments (high temperature and high pressure), and therefore have a high cost or are too fragile.

One of the objectives of this patent application is to be able to accurately determine the state of each module of a turboshaft engine without the need to add additional sensors in the modules of the turboshaft engine.

SUMMARY

The invention relates to a method for determining an efficiency fault of at least one module of an aircraft turboshaft engine, the turboshaft engine comprising at least one compressor module, at least one combustion chamber module and at least one turbine module, each module having an efficiency specific to it, the method of determination comprising:

A step of determining a performance mapping of the turboshaft engine, hereinafter "estimated real mapping", the estimated real mapping defining a plurality of mathematical relationships between parameters of the turboshaft engine, each mathematical relationship being determined from measurements of parameters of the turboshaft engine acquired during a given flight of the aircraft, A step of determining real indicators from the real mapping, said real indicators corresponding to operating singularities of the predetermined turboshaft engine, A step of determining a plurality of performance mappings from a simulation of a theoretical model of the turboshaft engine for different efficiency configurations, hereinafter "simulated mappings", the efficiency configuration determining the efficiency of each module, A step of determining simulated indicators for each simulated mapping, said simulated indicators corresponding to operating singularities of the predetermined turboshaft engine, A step of training a mathematical model by coupling simulated indicators with efficiency configurations and A step of applying said mathematical model to the real indicators so as to deduce therefrom a real efficiency configuration.

Thanks to the invention, an estimated real mapping of the turboshaft engine may be defined from a few parameter measurements during a given flight which advantageously makes it possible to calculate real indicators which are relevant and simple to calculate.

Using the theoretical model of the turboshaft engine, a mathematical model may be formed that is relevant and that may be applied directly to the real indicators to determine the efficiency configuration of the turboshaft engine, i.e. the change in the local efficiency of each module of the turboshaft engine. Advantageously, the mathematical model can be determined in an offset manner by processing a large volume of data. An efficiency fault of one or several modules may be determined shortly after the flight by analyzing the measurements obtained during the flight. Very advantageously, it is not necessary to increase the number of sensors in the turboshaft engine.

The term "efficiency" means a parameter that affects performance, whether it is effectively an efficiency, flow rate, or other. The term "efficiency configuration" refers to values of efficiencies, and/or deviations from reference efficiencies.

Preferably, during the step of determining, the real indicators are determined by comparing the real mapping with a reference mapping. In this way, the real indicators make it possible to highlight any deviation from a prior situation, e.g. a change in efficiency.

Preferably, the mathematical model is a classification or regression model.

Preferably, the reference mapping is obtained from the simulation of a theoretical model of the turboshaft engine for which the efficiency of each module is perfect. In this way, any deviation from a perfect efficiency of a module is highlighted in the real indicator.

Preferably, a correction sub-step and a filtering sub-step are performed on the parameter measurements of the turboshaft engine during the step of determining the real mapping. Thus, relevant mathematical relationships are formed without bias and without taking marginal measures into account.

Preferably, each mathematical relationship is obtained by computer training from the parameter measurements of the turboshaft engine acquired during a given flight of the aircraft. Computer training performs better than statistical training.

Preferably, each mathematical relationship is obtained by computer training from several models in order to determine the most relevant mathematical relationship for said parameters, the best mathematical relationship being obtained from regression or classification scores. A determination by analyzing scores makes it possible to determine the best model for each of the relationships quickly and repeatedly.

Preferably, each mathematical relationship is obtained by computer training from a portion of the parameter measurements of the turboshaft engine acquired during a given flight of the aircraft and another portion of the parameter measurements being used to validate the mathematical relationship obtained. Such a separation of measurements to determine the model and validate it makes it possible to prevent multiplying the amount of data needed.

The invention also relates to a computer program comprising instructions for executing steps of a method for determining an efficiency fault as presented previously when said program is executed by a computer. The invention also relates to a recording medium of said computer program. The recording medium mentioned above can be any entity or device capable of storing the program. For example, the medium may include a storage medium, such as a ROM, for example a CD ROM or a microelectronic circuit ROM, or a magnetic recording medium, for example a hard disk. On the other hand, the recording media may correspond to a transmissible medium such as an electrical or optical signal, which can be conveyed via an electrical or optical cable, radio or other means. The program according to the invention may in particular be downloaded onto an internet-type network. Alternatively, the recording media may correspond to an integrated circuit wherein the program is incorporated, the circuit being adapted to execute or to be used in the execution of the method in question.

DESCRIPTION OF THE DRAWINGS

The invention will be better understood upon reading the following description, given solely as an example, and by referring to the accompanying figures, given as non-limiting examples, wherein identical references are given to similar objects and wherein:

FIG. 1 is a schematic representation of an aircraft on which a turboshaft engine is mounted;

FIG. 2 is a schematic representation of the modules of a turboshaft engine;

FIG. 3 is a schematic representation of a step of determining an estimated real mapping and a step of determining real indicators;

FIG. 4 is a schematic representation of parameter measurements obtained during a given flight of the aircraft;

FIG. 5 is a schematic representation of the sub-steps for determining a real mapping;

FIG. 6 is a schematic representation of several mathematical relationships forming a real mapping;

FIG. 7 is a schematic representation of a reference mapping from the theoretical model of the turboshaft engine with perfect efficiency;

FIG. 8 is a schematic representation of the determination and use of a mathematical model.

It must be noted that the figures set out the invention in detail in order to implement the invention. Said figures may of course be used to better define the invention where applicable.

DETAILED DESCRIPTION

The invention relates to a method for determining a change in the efficiency of a module of an aircraft turboshaft engine. As an example, an aircraft A (helicopter) comprising a turboshaft engine T is shown in FIG. 1. As shown in FIG. 2, the turboshaft engine T comprises several modules, in particular a low-pressure compressor module 11, a high-pressure compressor module 12, a combustion chamber module 13, a high-pressure turbine module 14 and a low-pressure turbine module 15. It goes without saying that the number and type of modules 11-15 could be different depending on the turboshaft engine T in question.

Each module 11-15 has an efficiency R11-R15 that is specific to it. The R11-R15 efficiency of a module 11-15 corresponds to the ratio between its real performance and its theoretical performance of 100%. A variation in the efficiency R11-R15 is a sign of a fault in said module 11-15. According to one aspect of the invention, a variation in efficiency corresponds to a variation in flow rate. Therefore, when the performance of a turboshaft engine T drops, it is important to determine to which module(s) 11-15 this drop in performance can be attributed.

In reference to FIG. 3, a step of determining E1 a performance mapping of the turboshaft engine T, hereinafter referred to as "estimated real mapping" CARE, will first be presented. The estimated real mapping CARE is obtained by computer training from parameter measurements MiPj acquired during a given flight of aircraft A. As will be presented later, the estimated real mapping CARE allows a parameter Pj of the turboshaft engine T to be compared with at least one other parameter Pk of the turboshaft engine T, the parameters Pj, Pk being linked by a model determined by computer training.

In practice, in reference to FIG. 4, for said given flight VOL, measurements of parameters MiPj of turboshaft engine T are taken continuously or periodically. The measurements are carried out using sensors positioned in and in the vicinity of the turboshaft engine T. Preferably, there are few sensors and there is no need to add additional sensors compared to a conventional turboshaft engine.

In reference to FIG. 4, the measurements MiPj may include in particular temperature measurements, pressure measurements, speed measurements, torque measurements, or other. Preferably, measurements of the environmental parameters of the turboshaft engine T are also taken, in particular, of the outside temperature and the outside pressure. In reference to FIG. 4, measurements are obtained for three parameters P1, P2, P3.

Preferably, as shown in FIG. 5, the measurements MiPj are corrected in a correction sub-step ET11 to bring them back to comparable ambient conditions (ISA ground reference conditions). For example, measurements MiPj are converted to corrected measurements MiPj' to take the outside temperature into account. Preferably, again, the corrected measurements MiPj' are then filtered during a sub-step of filtering ET12 by comparison with certain minimum or maximum measurements or operating conditions (measurements in flight). The correction sub-step ET11 and the filtering sub-step ET12 are optional sub-steps that make it possible to highlight the relevance of the measurements for establishing the estimated real mappings CARE.

Thanks to all the measurements MiPj, MiPj', MiPj'', at least one mathematical relationship Fg between the different parameters Pj, Pk is trained during a sub-training step ET13. Preferably, the relationships Fg between the parameters Pj, Pk of the turboshaft engine T are trained by computer learning from time-correlated measurements MiPj, MiPj', MiPj''. Preferably, the mathematical relationship Fg is trained by computer training from several models in order to determine the most relevant mathematical relationship for said parameters Pj, Pk. Preferably, the best mathematical relationship is obtained from the regression or classification scores. Preferably, only a portion of the flight measurements is used to determine the mathematical relationship Fg linking the parameters Pj, Pk and another portion of the flight measurements is used to validate the mathematical relationship Fg.

Mathematical relationship Fg between parameters Pj, Pk means, for example, an internal temperature according to a rotational speed, a torque according to a temperature, or any other thermodynamic relationship. Redundancy of these links allows robust use of the results. In this example, in reference to FIG. 6, mathematical relationships F12, F13, F23 between parameters P1, P2 and P3 are shown. The trained mathematical relationships Fg make it possible to form an estimated real mapping CARE of the turboshaft engine T for the given flight VOL of the aircraft A. This estimated real mapping CARE is used to describe the behavior of the turboshaft engine T during the given flight VOL. Advantageously, due to successive training, the turboshaft engine T is mathematically modeled based on the measurements obtained by existing sensors.

Alternatively, the mathematical relationships Fg of the real mapping CARE may be statistically determined. For example, measurements MiPj are conditioned analogously, their distribution is determined and the main mode of this distribution is selected (which corresponds to the mathematical relationship sought).

As an example, measurements of an outlet temperature parameter T45 of the high-pressure turbine and a rotational speed parameter N1 of the gas generator are taken continuously during the operation of the turboshaft engine T. In this example, the parameters of the environment are also measured during the operation of the turboshaft engine T, in particular the external temperature T0 and/or the external pressure.

The measurements of parameters T45 and N1 are corrected in the thermodynamic direction according to the environmental parameters, in particular, the outside temperature T0 in order to obtain corrected measurements T45', N1' determined according to the following functions:

$$N1'=N1/\sqrt{T0/T0\text{ref}}$$

$$T45'=T45/T0*T0\text{ref}/T0*T0\text{ref wherein } T0\text{ref corresponds to a reference temperature (ISA ground)}$$

The corrected measurements T45', N1' are then filtered to keep only the most relevant corrected measurements, hereinafter, filtered measurements T45", N1". In practice, the corrected measurements T45', N1' are compared with predetermined thresholds (maximum and/or minimum thresholds) in order to ensure that the corrected measurements T45', N1' correspond to states where the power demand of the turboshaft engine is high enough. In other words, marginal measurements are withdrawn in favor of the most relevant measures. The relationship between the filtered measurements T45", N1" is then trained by computer training. Several mathematical relationships Fg are trained to form the estimated real mapping CARE.

The estimated real mapping CARE is the estimated real image of the turboshaft engine T during said flight of the aircraft over the operating range of the turboshaft engine T from a plurality of measurements MiPj obtained at different times. Advantageously, at each flight VOL of the aircraft A, the estimated real mapping CARE of turboshaft engine T is updated.

In reference again to FIG. 3, the method then comprises a step of determining E2 real indicators IRE from the estimated real mapping CARE and a reference mapping CAREF.

The real indicators IRE are intended to highlight a change in the efficiencies of the modules of the turboshaft engine T compared to an estimated real mapping CARE and a reference mapping CAREF. For example, a real indicator IRE may be presented as a maximum of differences between the mathematical relationships Fg of two mappings CARE, CAREF, generic statistics of these differences, barycenters of the slopes of curves, etc. The real indicators IRE may be of different natures and are determined to reflect a characteristic singularity of a decrease in efficiency. For example, some real indicators IRE are configured to highlight a fault of a compressor module 11, 12 or of a turbine module 14, 15. The real indicators IRE correspond to a set of mathematically defined singularities.

The reference mapping CAREF can be obtained in various ways. In particular, the reference mapping CAREF can be an average mapping of a turboshaft engine T, a mapping constructed from a previous flight or a simulated mapping.

In the present case, in reference to FIG. 7, the CAREF reference mapping is obtained from a theoretical model MOTH of the turboshaft engine T, i.e., defined from a plurality of mathematical and/or thermodynamic equations. Such a theoretical model MOTH is known to those skilled in the art. The reference mapping CAREF is not based on physical measurements taken on a real turboshaft engine T. Preferably, the reference mapping CAREF is based on a theoretical model MOTH of the turboshaft engine of which the efficiencies R11-R15 of the modules 11-15 are perfect (100%). The reference mapping CAREF is obtained by theoretical simulation by varying the inputs of the theoretical model MOTH to obtain different outputs. Similar to previously, mathematical relationships between the inputs/outputs of parameters Pj, Pk may be obtained and a reference mapping CAREF can be deduced.

Preferably, the estimated real mapping CARE and reference mapping CAREF have the same mathematical relationships Fg which may thus be easily compared to form real indicators IRE highlighting local efficiency faults.

In order to be able to detect an efficiency fault of a module of a turboshaft engine T, in reference to FIG. 8, the method comprises a step of estimating E3 a modification in the efficiency from a mathematical model CLASS applied to the real indicators IRE. Using the step of estimating E3, it is possible to determine the change in the efficiency R11-R15 of each module 11-15 of the turboshaft engine T and thus determine which of the modules 11-15 is defective.

The relevance of the mathematical model CLASS is important in order to obtain an accurate and relevant estimate of the efficiency R11-R15 of each module 11-15. To obtain the mathematical model CLASS, a plurality of simulated performance mappings CARSx are first determined as shown in FIG. 8.

Each simulated mapping CARSx is obtained from the theoretical model MOTH of the turboshaft engine T, i.e., defined from a plurality of mathematical and/or thermodynamic equations for which the theoretical model MOTH is configured with different efficiency configurations CR. For example, a first efficiency configuration CR1 may indicate that the low pressure compressor module 11 has a, efficiency of 50% whereas the other modules 12-15 have an efficiency of 100%. Similarly, another efficiency configuration CR2 may indicate that all modules 11-15 have an efficiency of 80%. Thus, the simulated mappings CARSx cover a very large number of efficiency configurations CR. The simulated mappings CARSx are thus an image of all the degrees of deterioration in the efficiency of the various modules 11-15 of the turboshaft engine T.

The method then comprises a step of determining E4 simulated indicators ISx from the simulated mappings CARSx and a reference mapping CAREF. Preferably, the simulated indicators ISx are obtained in a similar way to the real indicators IRE, each simulated mapping CARSx being used instead of the estimated real mapping CARE. The simulated indicators ISx are therefore elementary representatives of each efficiency configuration CR of the theoretical model MOTH of the turboshaft engine T. The same reference mapping CAREF is preferably used but it goes without saying that it could be different.

In a training step E5, the mathematical model CLASS is trained by linking simulated indicators ISx to efficiency configurations CR. Preferably, the mathematical model CLASS makes it possible to assign each simulated indicator ISx an efficiency configuration CR and therefore an efficiency loss for each module 11-15 (classification), or an efficiency loss value (regression), or deviations to reference efficiencies (regression). Thus, the sign of the change in the efficiency (loss or gain) and, preferably, the value of said change may be determined. By analyzing the simulated indicators ISx, it is therefore possible to determine the individual change in the efficiency of each module 11-15 of the turboshaft engine T. In this example, each efficiency configuration CR corresponds to a percentage of efficiency, but it goes without saying that it could correspond to a change (positive or negative) or a difference in efficiency compared to a reference efficiency (perfect or prior).

The mathematical model CLASS is preferably obtained by a regression operator, by a classification operator, by random forest, support vectors, closest neighbors, etc. Advantageously, the mathematical model CLASS can be obtained by efficient calculation means in order to obtain a wide variety of efficiency configurations CR, i.e., precision in the nature of the fault. The same mathematical model CLASS can be used advantageously for many flights for turboshaft engines of the same type.

In reference to FIG. 8, the mathematical model CLASS being obtained, the method comprises a step of applying E6 said mathematical model CLASS to the real indicators IRE in order to deduce a real efficiency configuration. The use of the mathematical model CLASS requires modest computing power, which makes it possible to determine an efficiency fault reactively after each given flight VOL.

For example, in the case of a classification operator, the mathematical model CLASS trains the relationship $\delta=f(I)$, where I are the indicators, and $\delta$ is a vector of which the components m corresponding to the modules are worth +1 if the efficiency of the module m has increased in relation to the reference, or −1 if it has decreased. In the case of a regression operator, the relationship trained is $\epsilon=f(I)$, where I are the indicators and $\epsilon$ is a vector of which the components m corresponding to the modules are $\eta_{m,ref}-\eta_{m,current}$, where $\eta_m$ is the efficiency of the module m, either in the reference state ($\eta_{m,ref}$) or in the current state ($\eta_{m,current}$).

At each new flight VOL, when new flight data is available, a new estimated real mapping CARE is performed with new real indicators IRE. By applying the mathematical model CLASS to the new real indicators IRE, a change in the efficiency of each module 11-15 of the turboshaft engine T is advantageously deduced. The state of health of each module 11-15 is thus known, which makes it possible to carry out suitable, in particular predictive, maintenance.

Preferably, the method comprises a step of monitoring the efficiencies R11-R15 of each module 11-15 and of determining a fault if at least one of the efficiencies is below a threshold or if its slope is below a threshold. The change in efficiencies is monitored individually and/or globally.

The invention claimed is:

1. A method for determining an efficiency fault of at least one module of a turboshaft engine of an aircraft, the at least one module of the turboshaft engine comprising at least one compressor module, at least one combustion chamber module, and at least one turbine module, each of the modules having an efficiency that is specific to it, the method comprising:

determining a performance mapping of the turboshaft engine so as to define an estimated real mapping, the estimated real mapping defining a plurality of mathematical relationships between parameters of the turboshaft engine, each of the mathematical relationships being determined from measurements of the parameters of the turboshaft engine acquired during a given flight of the aircraft, determining real indicators from the estimated real mapping, said real indicators corresponding to operating singularities of the turboshaft engine, determining a plurality of performance mappings from a simulation of a theoretical model of the turboshaft engine for different efficiency configurations so as to define simulated mappings, the efficiency configuration determining the efficiency of each module, determining simulated indicators for each of the simulated mappings, said simulated indicators corresponding to operating singularities of the turboshaft engine, training a mathematical model by linking the simulated indicators to the efficiency configurations, and applying said mathematical model to the real indicators in order to deduce a real efficiency configuration.

2. The method according to claim 1, wherein during the step of determining the real indicators, the real indicators are determined by comparing the estimated real mapping to a reference mapping.

3. The method according to claim 2, wherein the reference mapping is obtained from simulation of a theoretical model of the turboshaft engine for which the efficiency of each of the modules is perfect.

4. The method according to claim 3, wherein a correction sub-step and a filtering sub-step are performed on the parameter measurements of the turboshaft engine during the step of determining the performance mapping.

5. The method according to claim 3, wherein each mathematical relationship is obtained by computer training from the parameter measurements of the turboshaft engine acquired during the flight of the aircraft.

6. The method according to claim 5, wherein each of the mathematical relationships is obtained by computer training from several models in order to determine a most relevant mathematical relationship for said parameters, the best mathematical relationship being obtained from regression or classification scores.

7. The method according to claim 5, wherein each of the mathematical relationships is obtained by computer training from a portion of the parameter measurements of the turboshaft engine acquired during the flight of the aircraft, and another portion of the parameter measurements being used to validate the mathematical relationship obtained.

8. The method according to claim 2, wherein a correction sub-step and a filtering sub-step are performed on the parameter measurements of the turboshaft engine during the step of determining the performance mapping.

9. The method according to claim 2, wherein each mathematical relationship is obtained by computer training from the parameter measurements of the turboshaft engine acquired during the flight of the aircraft.

10. The method according to claim 9, wherein each of the mathematical relationships is obtained by computer training from several models in order to determine a most relevant mathematical relationship for said parameters, the best mathematical relationship being obtained from regression or classification scores.

11. The method according to claim 9, wherein each of the mathematical relationships is obtained by computer training from a portion of the parameter measurements of the turboshaft engine acquired during the flight of the aircraft, and another portion of the parameter measurements being used to validate the mathematical relationship obtained.

12. The method according to claim 1, wherein a correction sub-step and a filtering sub-step are performed on the parameter measurements of the turboshaft engine during the step of determining the performance mapping.

13. The method according to claim 12, wherein each mathematical relationship is obtained by computer training from the parameter measurements of the turboshaft engine acquired during the flight of the aircraft.

14. The method according to claim 13, wherein each of the mathematical relationships is obtained by computer training from several models in order to determine a most relevant mathematical relationship for said parameters, the best mathematical relationship being obtained from regression or classification scores.

15. The method according to claim 13, wherein each of the mathematical relationships is obtained by computer training from a portion of the parameter measurements of the turboshaft engine acquired during the flight of the aircraft, and another portion of the parameter measurements being used to validate the mathematical relationship obtained.

16. The method according to claim 1, wherein each mathematical relationship is obtained by computer training from the parameter measurements of the turboshaft engine acquired during the flight of the aircraft.

17. The method according to claim 16, wherein each of the mathematical relationships is obtained by computer training from several models in order to determine a most relevant mathematical relationship for said parameters, the best mathematical relationship being obtained from regression or classification scores.

18. The method according to claim 16, wherein each of the mathematical relationships is obtained by computer training from a portion of the parameter measurements of the turboshaft engine acquired during the flight of the aircraft, and another portion of the parameter measurements being used to validate the mathematical relationship obtained.

19. A non-transitory computer readable storage medium storing instructions that when executed by a computer, which includes a processor, performs a method, the method comprising:
   determining a performance mapping of a turboshaft engine so as to define an estimated real mapping, the estimated real mapping defining a plurality of mathematical relationships between parameters of the turboshaft engine, each of the mathematical relationships being determined from measurements of the parameters of the turboshaft engine acquired during a given flight of an aircraft,
   determining real indicators from the estimated real mapping, said real indicators corresponding to operating singularities of the turboshaft engine,
   determining a plurality of performance mappings from a simulation of a theoretical model of the turboshaft engine for different efficiency configurations so as to define simulated mappings, the efficiency configuration determining the efficiency of each module,
   determining simulated indicators for each of the simulated mappings, said simulated indicators corresponding to operating singularities of the turboshaft engine,
   training a mathematical model by linking the simulated indicators to the efficiency configurations, and
   applying said mathematical model to the real indicators in order to deduce a real efficiency configuration.

20. A computer-implemented method for determining an efficiency fault of at least one module of a turboshaft engine of an aircraft, the at least one module of the turboshaft engine comprising at least one compressor module, at least one combustion chamber module, and at least one turbine module, each of the modules having an efficiency that is specific to it, the computer-implemented method comprising:
   determining a performance mapping of a turboshaft engine so as to define an estimated real mapping, the estimated real mapping defining a plurality of mathematical relationships between parameters of the turboshaft engine, each of the mathematical relationships being determined from measurements of the parameters of the turboshaft engine acquired during a given flight of an aircraft,
   determining real indicators from the estimated real mapping, said real indicators corresponding to operating singularities of the turboshaft engine,
   determining a plurality of performance mappings from a simulation of a theoretical model of the turboshaft engine for different efficiency configurations so as to define simulated mappings, the efficiency configuration determining the efficiency of each module,
   determining simulated indicators for each of the simulated mappings, said simulated indicators corresponding to operating singularities of the turboshaft engine,
   training a mathematical model by linking the simulated indicators to the efficiency configurations, and
   applying said mathematical model to the real indicators in order to deduce a real efficiency configuration.

* * * * *